(12) United States Patent
Lutscher

(10) Patent No.: US 12,103,183 B2
(45) Date of Patent: Oct. 1, 2024

(54) ROBOT CONTROLLER

(71) Applicant: KUKA Deutschland GmbH, Augsburg (DE)

(72) Inventor: Ewald Lutscher, Augsburg (DE)

(73) Assignee: KUKA Deutschland GmbH (DE)

( * ) Notice: Subject to any disclaimer, the term of this patent is extended or adjusted under 35 U.S.C. 154(b) by 979 days.

(21) Appl. No.: 16/613,867

(22) PCT Filed: May 7, 2018

(86) PCT No.: PCT/EP2018/061635
§ 371 (c)(1),
(2) Date: Nov. 15, 2019

(87) PCT Pub. No.: WO2018/210590
PCT Pub. Date: Nov. 22, 2018

(65) Prior Publication Data
US 2020/0101604 A1    Apr. 2, 2020

(30) Foreign Application Priority Data
May 16, 2017 (DE) ...................... 10 2017 004 711.1

(51) Int. Cl.
*B25J 9/16* (2006.01)
*G05B 19/423* (2006.01)

(52) U.S. Cl.
CPC .......... *B25J 9/1633* (2013.01); *B25J 9/1643* (2013.01); *B25J 9/1676* (2013.01); *G05B 19/423* (2013.01);
(Continued)

(58) Field of Classification Search
CPC . B25J 9/16; B25J 9/1628; B25J 9/1633; B25J 9/1643; B25J 9/1674; B25J 9/1676;
(Continued)

(56) References Cited

U.S. PATENT DOCUMENTS 9,221,172 B2    12/2015  Williamson et al.
9,579,787 B2     2/2017  Zimmermann et al.
(Continued)

FOREIGN PATENT DOCUMENTS

DE    102014222809 B3    1/2016
DE    102015014994 B3    1/2017

OTHER PUBLICATIONS

Manuel Peinado et al: "Progressive Cartesian Inequality Constraints for the Inverse Kinematic Control of Articulated Chains", Dec. 31, 2005 (Dec. 31, 2005), pp. 1-4.
(Continued)

*Primary Examiner* — Khoi H Tran
*Assistant Examiner* — Sarah A Tran
(74) *Attorney, Agent, or Firm* — Dorton & Willis, LLP

(57) ABSTRACT

A method for controlling a robot includes detecting current positions of joints of the robot and actuating the joints using drives of the robot based on the detected current joint positions such that at least one drive supports a manual guidance-induced movement of the joint actuated by the drive if a distance between the detected or target joint position and a specified first boundary has a first value. The drive supports the manual guidance-induced movement to a lesser degree if the distance has a second value which is lower than the first value. Additionally, the manual guidance-induced movement is oriented towards the first boundary.

17 Claims, 2 Drawing Sheets

(52) U.S. Cl.
CPC ............. *G05B 2219/40344* (2013.01); *G05B 2219/40365* (2013.01); *G05B 2219/40371* (2013.01)

(58) Field of Classification Search
CPC ........ G05B 19/00; G05B 19/02; G05B 19/42; G05B 19/423; G05B 2219/30; G05B 2219/40; G05B 2219/40344; G05B 2219/40365; G05B 2219/40371
USPC ........................................................ 700/260
See application file for complete search history.

(56) References Cited

U.S. PATENT DOCUMENTS

| | | | |
|---|---|---|---|
| 9,592,608 B1* | 3/2017 | Bingham | ............. G05B 19/423 |
| 2002/0120363 A1 | 8/2002 | Salisbury et al. | |
| 2004/0128026 A1 | 7/2004 | Harris et al. | |
| 2014/0081461 A1* | 3/2014 | Williamson | ........... B25J 9/1643 |
| | | | 700/261 |
| 2015/0127151 A1* | 5/2015 | Riedel | ........................ B25J 9/06 |
| | | | 700/250 |
| 2016/0129588 A1* | 5/2016 | Pfaff | .......................... B25J 9/06 |
| | | | 901/4 |
| 2017/0144302 A1 | 5/2017 | Rohmer et al. | |
| 2021/0121255 A1* | 4/2021 | Phillips | .................. A61B 34/74 |

OTHER PUBLICATIONS

European Patent Office; Search Report in related International Patent Application No. PCT/EP2018/061635 dated Jul. 25, 2018; 3 pages.

European Patent Office; Written Opinion in related International Patent Application No. PCT/EP2018/061635 dated Jul. 25, 2018; 11 pages.

* cited by examiner

ROBOT CONTROLLER

CROSS-REFERENCE TO RELATED APPLICATIONS

This application is a national phase application under 35 U.S.C. § 371 of International Patent Application No. PCT/EP2018/061635, filed May 7, 2018, which claims the benefit of priority to German Patent Application No. DE 10 2017 004 711.1, filed May 16, 2017, the disclosures of which are incorporated by reference herein in their entirety.

TECHNICAL FIELD

The present invention relates to a method and a system for controlling a robot, and to an assembly comprising the system and a computer program product for carrying out the method.

BACKGROUND

Various approaches are known for manipulating robots. It is thus possible for a robot to be moved manually, for example by means of current limitation in drive motors and omission of an integral component of position control.

More advanced approaches are generally based on force, in particular admittance, control, in which the robot follows or attempts to avoid joint forces exerted on a robot-guided force sensor or induced by manual loading of a robot limb, and, in the present case, for the purpose of more concise illustration, antiparallel force pairs or (torques)/moments are also denoted, in a generalizing manner, as forces, and regulation, i.e. specification of control variables as a function of detected actual variables, in particular the difference thereof from specified target variables, also being denoted, in a generalizing manner, as control.

SUMMARY

The object of the present invention is that of improving a robot controller.

This object is achieved by a method having the features disclosed herein. A system or a computer program product for carrying out the method, and an assembly comprising such a system are also described herein.

According to one embodiment of the present invention, a method for controlling a robot comprises the step of: detecting current positions of joints of the robot, in particular by means of joint position sensors, in particular joint angle sensors, for example resolvers, encoders or the like.

In one embodiment, the robot comprises at least three, in particular at least six, in particular at least seven joints, in particular revolute joints, or (movement, in particular rotational) axes. Said robot can in particular comprise an articulated robot arm, and in particular be such an arm.

In one embodiment, six or more joints advantageously make it possible to depict a wide range of positions and orientations, in space, of a distal robot (arm) flange or robot-guided tool or workpiece, and seven or more joints advantageous make it possible to depict the same position and orientation in different robot (arm) poses.

In one embodiment, the robot (arm) comprises drives for actuating, in particular moving or adjusting the joints or (movement) axes, in particular electric motors, in particular servo motors.

According to one embodiment of the present invention, the method comprises the step of: actuating the joints by means of the drives of the robot, on the basis of or depending on the detected current joint positions, such that, in particular provided that, at least one drive, which will also be denoted in the following as a (software) limited drive, assists a movement, induced by manual guidance, of the joint actuated thereby, if a spacing between the (current) detected or target joint position thereof and a specified first limit is of a first value, in particular magnitude, and assists said movement to a lesser extent, in comparison, if said spacing is of a second value, in particular magnitude, that is smaller, in particular in magnitude, than the first value, and (if) in addition the movement induced by manual guidance is directed towards the first limit.

As a result, in one embodiment, in the event of manual guidance of the robot on the basis of detected joint positions, which guidance can advantageously take place using a slower control clock frequency, in particular software-based end stops of joints can advantageously be taken into account as force regulation.

In one embodiment, manual guidance comprises manual application of an external force to one or more limbs and/or joints of the robot (arm), in particular manual movement of one or more limbs and/or joint of the robot (arm) (by means of an external force that is applied manually).

Accordingly, a movement of a joint induced by manual guidance in particular comprises, in particular direct or indirect, movement or adjustment of the joint or axis owing to or on account of the manual guidance.

In one embodiment, the (limited) drive or a drive assists a movement, induced by manual guidance, of a joint actuated thereby, by means of impressing or exerting a drive force, thus, in particular in the case of a revolute joint, a drive (torque/) moment, on the joint or the axis that is in the same direction as said movement. Accordingly, in one embodiment, a drive more strongly assists a movement induced by manual guidance, by means of impressing or exerting a larger equidirectional (moving) drive force on the joint, and assists said movement to a lesser extent (in comparison therewith), by means of impressing or exerting a (comparatively) smaller equidirectional (moving) drive force, in particular no (moving or merely a retaining) drive force, or even an opposing (moving) drive force, on the joint. In other words, the robot "follows" manual guidance more easily in the (limited) joint or is more compliant (in terms of control technology) in the (limited) joint, if the spacing is of the first value, and with more difficulty or with greater resistance, in comparison therewith, if the spacing is of the second value. In one embodiment, assistance of a movement, induced by manual guidance, of a joint by a or the (limited) drive comprises specification of a target joint position change in the same direction as said movement, or a (new) target joint position in the direction of said movement and/or impedance control.

In one embodiment, the method comprises the step of: actuating the joints by means of the drives of the robot, on the basis of or depending on the detected current joint positions, such that, in particular provided that, the (limited) drive assists the movement, induced by manual guidance, of the joint actuated thereby, if a spacing between the (current) detected or target joint position thereof and a specified second limit is of a third value, in particular magnitude, and assists said movement to a lesser extent, in comparison, if said spacing is of a fourth value, in particular magnitude, that is smaller, in particular in magnitude, than the third value, and in addition the movement induced by manual guidance is directed towards the second limit. In one embodiment, the third value can be the first value or can be different therefrom, and in an embodiment the fourth value can be the second value or can be different therefrom.

In one embodiment, the first and second limit thus limit a permissible movement or adjustment range of the joint to both sides. In particular, the first limit may be an upper limit and the second limit a lower limit, or vice versa the first limit may be a lower limit and the second limit an upper limit. In one embodiment, the first and/or second limit is specified by means of software technology, in particular stored.

As a result, in one embodiment, end stops of joints can advantageously be taken into account. In one embodiment, fixed limits make it possible for a mechanism of the robot to be reliably protected; variable limits make it possible for a working space of the robot to be advantageously changed, in particular adapted to different boundary conditions.

In one embodiment, the (limited) drive does not assist the movement, induced by manual guidance, of the joint actuated thereby if the spacing between the detected or target joint position and the first or second limit is at most of a specified minimum magnitude, which can in particular also be zero. In a development, the (limited) drive even opposes the movement, induced by manual guidance, of the joint actuated thereby if the spacing is at most of the minimum magnitude, in particular in that said drive attempts to restore the joint, counter to the movement induced by manual guidance, or impresses or exerts a corresponding drive force.

In addition or alternatively, in one embodiment the (limited) drive does not assist the movement, induced by manual guidance, of the joint actuated thereby, if or although the spacing between the detected or target joint position and the first limit is smaller than the first value but or insofar as the movement induced by manual guidance is directed away from the first limit, and/or if or although the spacing between the detected or target joint position and the second limit is smaller than the third value, but or insofar as the movement induced by manual guidance is directed away from the second limit.

As a result, in one embodiment, end stops of joints can particularly advantageously be taken into account.

In one embodiment, assistance by the drive of the movement, induced by manual guidance, of the joint, in particular a drive force in the same direction as the movement, and/or a target joint position change, is reduced evenly, in particular very evenly, in particular linearly, at least in a specified range of the spacing between the detected or target joint position and the first or second limit, if the movement induced by manual guidance is directed towards said limit.

As a result, increasingly slow robot behavior in the event of approaching a limit, can indicate said approach to the manually guiding user, and/or make a movement towards the limit increasingly difficult, and thus in particular reduce the likelihood of undesired exceeding of an end position or blocking in an end position.

In one embodiment, the (limited) drive actuates the joint j in order to assist the movement, induced by manual guidance, of the joint on the basis of, in particular with the aid of, a current change $q_{j,\,Cmd}(t_2) - q_{j,\,Cmd}(t_1)$ or $q_{j,\,Cmd}(i+1) - q_{j,\,Cmd}(i)$ of a or the target joint position $q_{j,\,Cmd}$ which is dependent, in particular proportionally, on a difference between the detected current joint position of the joint actuated thereby and a current target joint position for the drive, in particular in that a new (commanded) target joint position $q_{j,\,Cmd}(t_2)$ or $q_{j,Cmd\,(i+1)}$ which the drive attempts to ready or which is specified for said drive, is determined from the sum of the previous (commanded) target joint position $_{Cmd}(t_1)$ bzw. $q_{j,\,Cmd}(i)$ and the difference $[q_{j,Msr}(t_1) - q_{j,\,Cmd}(t_1)]$ or $[q_{j,Msr}(i) - q_{j,\,Cmd}(i)]$, multiplied by a proportionality factor $k_j$, between the detected current joint position $q_{j,Msr}(t_1)$ bzw. $q_{j,Msr}(i)$ and the preceding commanded target joint position:

$$q_{j,Cmd}(t_2) = q_{j,Cmd}(t_1) + k_j \cdot [q_{j,Msr}(t_1) - q_{j,Cmd}(t_1)] \quad (1)$$

or $$q_{j,Cmd}(i+1) = q_{j,Cmd}(i) + k_j \cdot [q_{j,Msr}(i) - q_{j,Cmd}(i)] \quad (1')$$

This in particular makes it possible, in one embodiment, for differential impedance control to be carried out, which advantageously does not require any (rapid) force detection or control, and accordingly is or can be implemented in an embodiment without such detection or control.

In one embodiment, a or the proportionality factor kj of the dependency of the current change in the target joint position depends on the difference from the direction of the movement induced by manual guidance and/or, in particular linearly at least in regions, on the spacing between the (current) detected or target joint position and the first and/or second limit, in the case of a development in the form (cf. FIG. 3) of $$k_j = \begin{cases} 0 & \Leftrightarrow \quad d_j \leq 0 \\ k_{j,sat} & \Leftrightarrow \quad d_j \geq d_{j,thresh} \\ \dfrac{k_{j,sat}}{d_{j,thresh}} \cdot d_j & \Leftrightarrow \quad 0 < d_j < d_{j,thresh} \end{cases} \quad (2)$$

having the spacing $$d_j = \begin{cases} |q_{jM} - q_j| & \Leftrightarrow \quad |q_{jM} - q_j| \leq |q_j - q_{jm}| \text{ and } \dfrac{dq_j}{dt} > 0 \\ |q_j - q_{jm}| & \Leftrightarrow \quad |q_j - q_{jm}| \leq |q_{jM} - q_j| \text{ and } \dfrac{dq_j}{dt} < 0 \\ d'_{j,thresh} > d_{j,thresh} & \Leftrightarrow \quad \text{otherwise} \end{cases} \quad (3)$$

having the first limit $q_{jM}$ and the smaller second limit $q_{jm} < q_{jM}$, and the abbreviation $q_j = q_{j,\,Msr}(t_1)$ and/or $q_{j,\,Msr}(i)$, or $q_j = q_{j,\,Cmd}(t_1)$ and/or $q_{j,\,Cmd}(i)$.

As a result, the increasingly slow robot behavior described above can be achieved particularly advantageously when approaching a limit.

In one embodiment, the method comprises the step of: actuating the joints by means of the drives of the robot on the basis of or depending on the detected current joint positions, such that, in particular provided that, a minimum spacing between a fixed point, which is in particular specified by means of hardware and/or software and is fixed in the surroundings or in space, and a reference fixed to the robot, in particular a robot-guided shank, is minimized, and in the process in addition the (limited) drive actuates the joint actuated thereby in the manner described herein, in order to assist the movement induced by manual guidance, provided or insofar as this is (in addition still) possible when the minimum spacing is minimized.

As a result, in one embodiment, the advantageous consideration, described herein, of software-based end stops of joints, in particular the reduction of the likelihood of undesired exceeding of or blocking in an end position, can, as a secondary or lower order or lower priority object, also improve manual guidance of a robot which attempts, as the primary or main or higher order or higher priority object, to retain the robot at the fixed point, in particular to guide the shaft through a specified fixed point. Particularly advantageously, the shaft may be the shaft of a (robot-guided)

surgical instrument and/or the specified fixed point may be what is known as a trocar point or a natural or artificial body orifice, through which the shaft is inserted for an, in particular minimally invasive, investigation and/or operation, without the present invention being restricted to this application.

In one embodiment, the drives actuate the joints on the basis of or depending on a current change in a target joint position which depends on, in particular is determined on the basis of, a minimum spacing, which is in particular cartesian and transformed in the joint space, between the reference fixed to the robot and the specified fixed point, in particular a (task) vector which contains said spacing.

In addition or alternatively, in one embodiment a current change in a target joint position of the (limited) drive for assisting the movement, induced by manual guidance, of the joint j actuated thereby is projected into a null space of the minimization of the minimum spacing between the specified fixed point and the reference fixed to the robot.

As a result, in one embodiment, the minimization of the minimum spacing between the specified fixed point and the reference fixed to the robot can be implemented, as a primary object, in the form of differential impedance control, and in the process the software-based end stops can advantageously also be taken into account in addition, as far as possible, as a secondary object.

In one embodiment, the point C on the reference fixed to the robot, i.e. in particular the robot-guided shank, closest to the fixed point T (in cartesian terms) is determined, such that a (task) vector $X_{CT}$ describes the, in particular two-dimensional, minimum spacing between the reference fixed to the robot and the specified fixed point, and comprises, in one embodiment, 2 dimensions or components for said spacing and/or (at least) one dimension or (task) component for a redundancy parameter, in particular an elbow angle of the robot. Using a pseudoinverse, in particular the Moore-Penrose pseudoinverse, $J^+$, of the (task) Jacobian matrix J, which is composed of the Jacobian matrix of the robot which maps joint speeds dq/dt of the robot onto a cartesian speed of the point C, and the Jacobian matrix of the redundancy parameter, in particular elbow angle, and the unit matrix I, the null space projection or the operator N thereof, results, in a known manner, as $$N = I - J^+ J \quad (4)$$

and thus the new (commanded) target joint positions $q_{Cmd}(t_2)$ or $q_{Cmd}(i+1)$, in particular in accordance with $$q_{Cmd}(t_2) = q_{Cmd}(t_1) + J^+ \cdot X_{CT}(t_1) + N \cdot K \cdot [q_{Msr}(t_1) - q_{Cmd}(t_1)] \quad (5)$$

or $$q_{Cmd}(i+1) = q_{Cmd}(i) + J^+ \cdot X_{CT}(i) + N \cdot K \cdot [q_{Msr}(i) - q_{Cmd}(i)] \quad (5'),$$

having the diagonal matrix $K = \text{diag}\{k_1, \ldots\}$ and the vector of the joint positions $q = [q_1, \ldots]^T$. It is clear that the minimum cartesian spacing or the minimization thereof, in differential form, is specified as the primary object of a redundancy resolution, and, as a secondary object, the assistance of the joint movements induced by manual guidance is projected into the null space of said redundancy resolution.

According to one embodiment of the present invention, a system for controlling a robot, in particular a system of an assembly comprising the robot, is designed, in particular in terms of hardware and/or software, in particular in terms of programming technology, to carry out a method described herein, and/or comprises: means for detecting current positions of joints of the robot; and means for actuating the joints by means of drives of the robot, on the basis of said detected current joint positions, such that at least one drive assists a movement, induced by manual guidance, of the joint actuated thereby, if a spacing between the detected or target joint position thereof and a specified first limit is of a first value, and assists said movement to a lesser extent, in comparison, if said spacing is of a second value that is smaller than the first value, and in addition the movement induced by manual guidance is directed towards the first limit.

In one embodiment, the system or the means thereof comprises/comprise:
means for actuating the joints by means of the drives of the robot, on the basis of the detected current joint positions, such that the drive assists the movement, induced by manual guidance, of the joint actuated thereby, if a spacing between the detected or target joint position thereof and a specified second limit is of a third value, and assists said movement to a lesser extent, in comparison, if said spacing is of a fourth value that is smaller than the third value, and in addition the movement induced by manual guidance is directed towards the second limit.

In addition or alternatively, the system or the means thereof is/are designed, in particular in terms of hardware and/or software, in particular in terms of programming technology, such that the drive does not assist the movement, induced by manual guidance, of the joint actuated thereby, if the spacing between the detected or target joint position and the first or second limit is at most of a specified minimum magnitude, and/or assists said movement, if the spacing between the detected or target joint position and the first limit is smaller than the first value but the movement induced by manual guidance is directed away from the first limit, and/or if the spacing between the detected or target joint position and the second limit is smaller than the third value, but the movement induced by manual guidance is directed away from the second limit.

In addition or alternatively, in one embodiment, the system or the means thereof comprises/comprise:
means for evenly, in particular very evenly, in particular linearly, reducing assistance by the drive of the movement, induced by manual guidance, of the joint, at least in a specified range of the spacing between the detected or target joint position and the first or second limit, if the movement induced by manual guidance is directed towards said limit; and/or
means for actuating the joint by means of the drive for assisting the movement, induced by manual guidance, of the joint, on the basis of a current change in a or the target joint position which depends, in particular proportionally, on a difference between the detected current joint position of the joint actuated thereby and a current target joint position for the drive, in a development, a proportionality factor of the dependency of the current change in a target joint position depending on the difference from the direction of the movement induced by manual guidance and/or, in particular linearly at least in regions, on the spacing between the detected or target joint position and the first and/or second limit; and/or
means for actuating the joints by means of the drives of the robot on the basis of the detected current joint positions, such that a minimum spacing between a specified fixed point and a reference fixed to the robot, in particular a robot-guided shank, is minimized, and for additionally actuating the joint actuated by the drive in the process, in order to assist the movement induced by manual guidance as far as possible; and/or means for actuating the joints by means of the drives on the basis of a current change in a target joint position which depends on a minimum spacing, which is in particular cartesian and transformed in the joint space, between the reference fixed to the robot and the specified fixed point; and/or means for projecting a current change in a target joint position of the drive for assisting the movement, induced by manual guidance, of the joint actuated thereby, into a null space of the minimization of the minimum spacing between the specified fixed point and the reference fixed to the robot.

A means within the meaning of the present invention can be designed so as to be hardware-based and/or software-based, and can in particular comprise an in particular digital processing unit, in particular microprocessor unit (CPU), which is preferably in data or signal connection with a memory and/or bus system, and/or one or more programs or program modules. The CPU can be designed to process commands that are implemented as a program stored in a memory system, to detect input signals from a data bus, and/or to emit output signals to a data bus. A memory system may comprise one or more, in particular different, storage media, in particular optical, magnetic, solid state, and/or other nonvolatile media. The program can be configured such that it embodies or is capable of executing the methods described herein, such that the CPU can carry out the steps of such methods and can thus in particular control the robot.

In one embodiment, one or more, in particular all, of the steps of the method are performed in a completely or partially automated manner, in particular by the system or the means thereof.

Further advantages and features can be found in the dependent claims and in the embodiments.

BRIEF DESCRIPTION OF THE DRAWINGS

The accompanying drawings, which are incorporated in and constitute a part of this specification, illustrate exemplary embodiments of the invention and, together with a general description of the invention given above, and the detailed description given below, serve to explain the principles of the invention.

DETAILED DESCRIPTION

Figure 1:
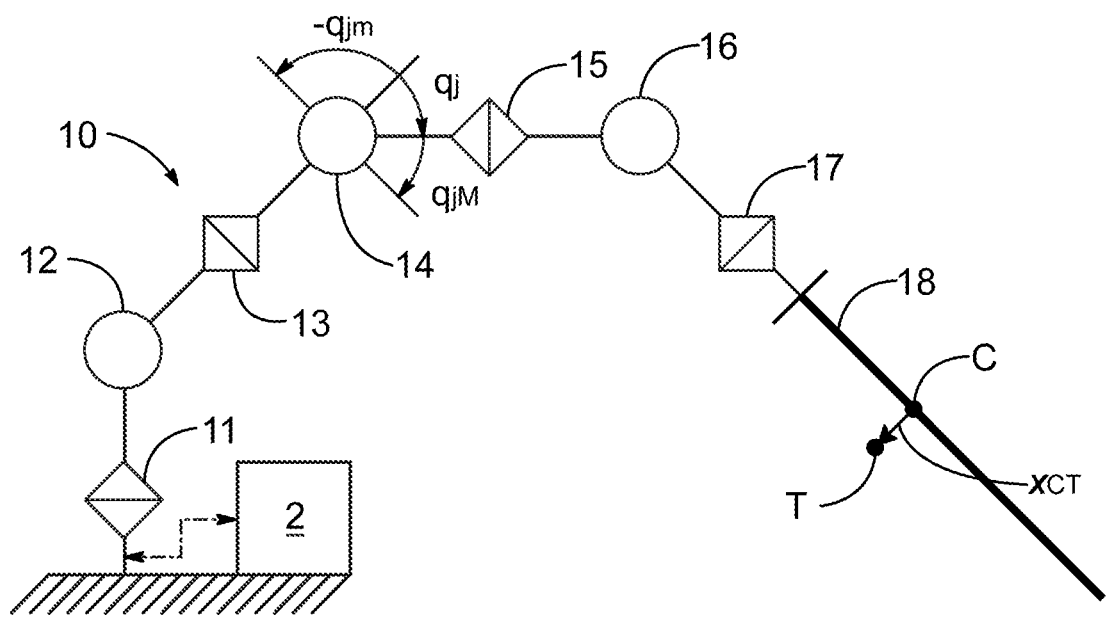
FIG. 1 shows an assembly comprising a robot and a system for controlling the robot according to an embodiment of the present invention.
Figure 2:
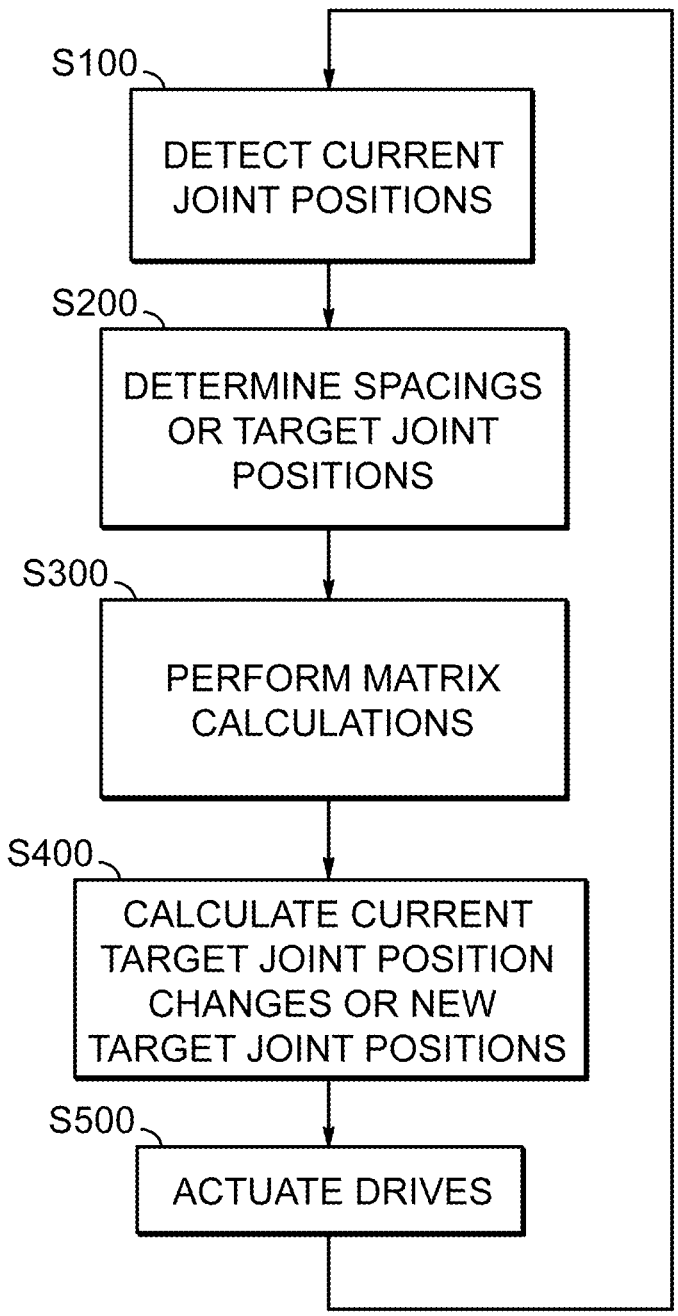
FIG. 2 illustrates a method for controlling the robot according to an embodiment of the present invention.

FIG. 1 shows an assembly comprising a robot 10 and a system comprising a robot controller 2 for controlling the robot 10 according to an embodiment of the present invention, which assembly carries out and/or is designed for a method shown in FIG. 2 for controlling the robot according to an embodiment of the present invention.

The robot 10 comprises seven joints comprising joint position sensors and drives 11-17, and a robot-guided shank 18, which shank the robot is to guide through a fixed point T. The spacing between the shank 18 and the fixed point T is shown in a highly exaggerated manner, for purposes of clarity.

By way of example, a current joint position $q_j$ detected by the corresponding joint position sensor, and a first upper limit $q_{jM}>0$ and second lower limit $q_{jm}<0$, specified by means of software, are indicated for one of the joints.

In a step S100 (cf. FIG. 2), the current joint positions $q_{Msr}(i)=[q_1, \ldots, q_j, , ,]^T$ are detected using the joint position sensors.

Figure 3:
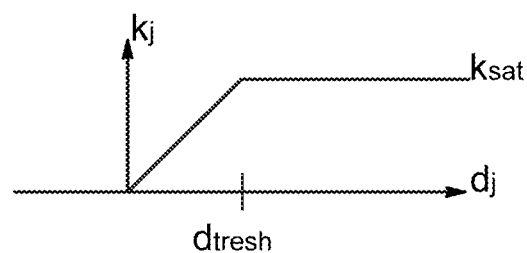
FIG. 3 shows an exemplary proportionality factor used in the method of FIG. 2.

In a step S200, the spacings from the joint-specific first upper limits and second lower limits are determined herefrom or from (current or most recently commanded) target joint positions $q_{Cmd}(i)=[q_1, \ldots, q_j, , ,]^T$, for the individual joints, for example according to the above equation (3). Proportionality factors are determined herefrom, for example according to the above equation (2). By way of example, in this respect FIG. 3 shows the proportionality factor $k_j$ for joint j, depending on the spacing $d_j$ thereof from the first upper limit $q_{jm}$ and second lower limit $q_{jm}$ thereof.

In a step S300, the controller 2 determines the point C on the robot-guided shank 18 that is (located) closest to the fixed point T, the (task) vector $X_{CT}$ that is made up of the (two-dimensional) spacing from C according to T, and a target delta for the redundancy parameter, in particular the elbow angle, and which, in one embodiment, is zero, and the Moore-Penrose pseudoinverse $J^+$, (task) Jacobian matrix J, and the operator N of the null space projection (cf. equation (4) above).

From this, in a step S400 the controller 2 calculates current target joint position changes or new target joint positions, for example according to the above equation (5) or (5').

In step S500, said controller actuates the drives of the joints 11-17 in accordance with said new target joint positions.

Finally, said controller performs step S100 again, said target joint positions determined in step S400 now being used as current target joint positions of the new control phase or cycle.

In a variant, in particular step S300 can be omitted. Then, in step S400 the controller 2 calculates the current target joint position changes or new target joint positions, for example according to the above equation (1) or (1').

It can be seen that, if a joint j approaches for example the first upper limit thereof, the corresponding proportionality factor $k_j$ reduces linearly from $k_{sat}$ to 0 at $d_j=0$, after falling below the spacing $d_{thresh}$ (cf. equations (2) and (3), and FIG. 3). Accordingly, the assistance of a movement induced by manual guidance is reduced, since the deviation, cause by the manual guidance, between the currently detected joint position and the current target joint position is increasingly hidden, in the differential determination of the current target joint position change or new target joint position (cf. equations (1), (1'), (5), (5')), and the robot in the corresponding joint attempts to retain the former target joint position thereof. The robot thus acts "more slowly" for the manually guiding operator. In contrast, if the manual guidance causes a movement away from the closer limit, the robot or the corresponding joint follows in a more agile manner (again), owing to the assistance by the drive.

Insofar as the guidance of the shank 18 through the fixed point T should or must be considered the primary object, said spacing-dependent reduction of the assistance of the manual guidance is also taken into account, in differential form, as a secondary object, as far as this is possible taking account of the primary object.

As a result of said differential impedance, optionally while resolving the redundancy with respect to the primary object, it is possible to achieve stable manual guidance of the robot, and in the process to prevent blocking in software-based end stops, in an embodiment having a slower clock frequency and/or, in particular in the case of mechanical compliance in the joints, even without force detection in the joints.

Although embodiments given by way of example have been explained in the preceding description, it is noted that a plurality of modifications are possible. It should furthermore be noted that the embodiments given by way of example are merely examples which are not intended to restrict the scope of protection, the applications and the structure in any way. Instead, the above description provided guidance for a person skilled in the art to implement at least one embodiment given by way of example, it being possible for various amendments to be made, in particular in view of the function and arrangement of the described components, without departing from the scope of protection as emerges from the claims and the combinations of features equivalent thereto.

While the present invention has been illustrated by a description of various embodiments, and while these embodiments have been described in considerable detail, it is not intended to restrict or in any way limit the scope of the appended claims to such detail. The various features shown and described herein may be used alone or in any combination. Additional advantages and modifications will readily appear to those skilled in the art. The invention in its broader aspects is therefore not limited to the specific details, representative apparatus and method, and illustrative example shown and described. Accordingly, departures may be made from such details without departing from the spirit and scope of the general inventive concept.

LIST OF REFERENCE SIGNS 2 controller
10 robot (arm)
11-17 joint comprising joint position sensor and drive
18 shank
C point on the shank closest to the fixed point
T fixed point
$X_{ct}$ (task) vector at a spacing from C according to T

What is claimed is:

1. A method for controlling a robot having a plurality of joints actuated by respective drives, comprising:
   detecting current positions of the joints of the robot; and
   actuating the joints using the drives of the robot based on the detected current joint positions, such that:
      at least one drive assists a movement of its associated joint, induced by a manual guidance applied to the robot by a user, to a first extent and in the same direction as the movement, when a spacing between the detected joint position or a target joint position of the associated joint and a specified first limit of the associated joint has a first value, and
      the at least one drive assists the movement of the associated joint to a second extent, less than the first extent, when the spacing has a second value that is less than the first value, and the movement induced by the manual guidance is directed toward the first limit.

2. The method of claim 1, further comprising:
   actuating the joints using the drives of the robot based on the detected current joint positions such that:
      the at least one drive assists the movement of its associated joint, induced by the manual guidance, to a third extent when a spacing between the detected joint position or target joint position thereof and a specified second limit has a third value, and
      the at least one drive assists the movement of the associated joint to fourth extent, less than the third extent, if the spacing has a fourth value that is less than the third value, and the movement induced by the manual guidance is directed toward the second limit.

3. The method of claim 2, wherein the at least one drive at least one of:
   does not assist the manual guidance induced movement of the associated joint when the spacing between the detected joint position or target joint position and the first or second limit has, at most, a specified minimum magnitude; or
   assists the manual guidance induced movement of the associated joint when at least one of:
      the spacing between the detected joint position or target joint position and the first limit is smaller than the first value, but the movement induced by manual guidance is directed away from the first limit, or
      the spacing between the detected joint position or target joint position and the second limit is smaller than the third value, but the movement induced by manual guidance is directed away from the second limit.

4. The method of claim 2, wherein the assistance by the drive of the manual guidance induced movement of the associated joint is reduced, at least in a specified range of the spacing between the detected joint position or target joint position and the first or second limit, when the movement induced by the manual guidance is directed toward the first or second limit.

5. The method of claim 4, wherein the assistance by the drive is at least one of evenly reduced or linearly reduced.

6. The method of claim 1, wherein the drive actuates the joint in order to assist the manual guidance induced movement of the joint based on a current change in a target joint position which depends on a difference between the detected current joint position of the joint and a current target joint position.

7. The method of claim 6, wherein the current change in a target joint position depends proportionally on the difference between the detected current joint position and the current target joint position.

8. The method of claim 7, wherein a proportionality factor of the dependency of the current change in a target joint position depends on at least one of:
   a difference from the direction of the movement induced by the manual guidance; or
   on the spacing between the detected joint position or target joint position and at least one of the first or second limit.

9. The method of claim 8, wherein the proportionality factor depends linearly, at least in regions, on the spacing between the detected joint position or target joint position and at least one of the first or second limit.

10. The method of claim 1, further comprising:
    actuating the joints using the drives of the robot based on the detected current joint positions such that a minimum spacing between a specified fixed point and a reference fixed to the robot is minimized;
    whereby, in the process, the at least one drive in addition actuates the joint, as far as possible, for assisting the manual guidance induced movement.

11. The method of claim 10, wherein the reference fixed to the robot is a robot-guided shank.

12. The method of claim 10, further comprising:
    actuating the joints using the drives based on a current change in a target joint position which depends on a minimum spacing between the reference fixed to the robot and the specified fixed point.

13. The method of claim 12, wherein the minimum spacing is cartesian and transformed in the joint space.

14. The method of claim 12, further comprising:
projecting a current change in a target joint position of the drive that assists the manual guidance induced movement of the joint into a null space of the minimization of the minimum spacing between the specified fixed point and the reference fixed to the robot.

15. A system for controlling a robot having a plurality of joints actuated by respective drives, the system comprising:
means for detecting current positions of joints of the robot; and
means for actuating the joints using the drives of the robot based on the detected current joint positions, such that:
at least one drive assists a movement of its associated joint, induced by a manual guidance applied to the robot by a user, to a first extent and in the same direction as the movement, when a spacing between the detected joint position or a target joint position of the associated joint and a specified first limit of the associated joint has a first value, and
the at least one drive assists the movement of the associated joint to a second extent, less than the first extent, when the spacing has a second value that is less than the first value, and the movement induced by the manual guidance is directed toward the first limit.

16. An assembly comprising a robot and the system according to claim 15 for controlling the robot.

17. A computer program product usable with a robot having a plurality of joints actuated by respective drives, the computer program product comprising a program code stored on non-transitory computer-readable medium, the program code, when executed by a computer, causing the computer to:
detect current positions of the joints of the robot; and
actuate the joints using the drives of the robot based on the detected current joint positions, such that:
at least one drive assists a movement of its associated joint, induced by a manual guidance applied to the robot by a user, to a first extent and in the same direction as the movement, when a spacing between the detected joint position or a target joint position of the associated joint and a specified first limit of the associated joint has a first value, and
the at least one drive assists the movement of the associated joint to a second extent, less than the first extent, when the spacing has a second value that is less than the first value, and the movement induced by the manual guidance is directed toward the first limit.

* * * * *